March 2, 1954    H. T. VAN HOUTEN ET AL    2,670,848
FLOATING SELF-ADJUSTING LIQUID SKIMMER
Filed May 3, 1951                               2 Sheets-Sheet 1

Inventors: Hermanus T. van Houten
Ludovicus J. P. Smulders
Johannes H. van Zeeland
By: Oswald H. Milmore
Their Attorney

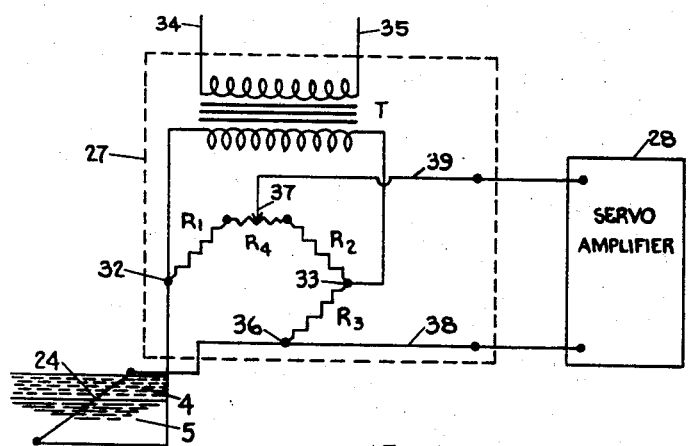
Fig. 5
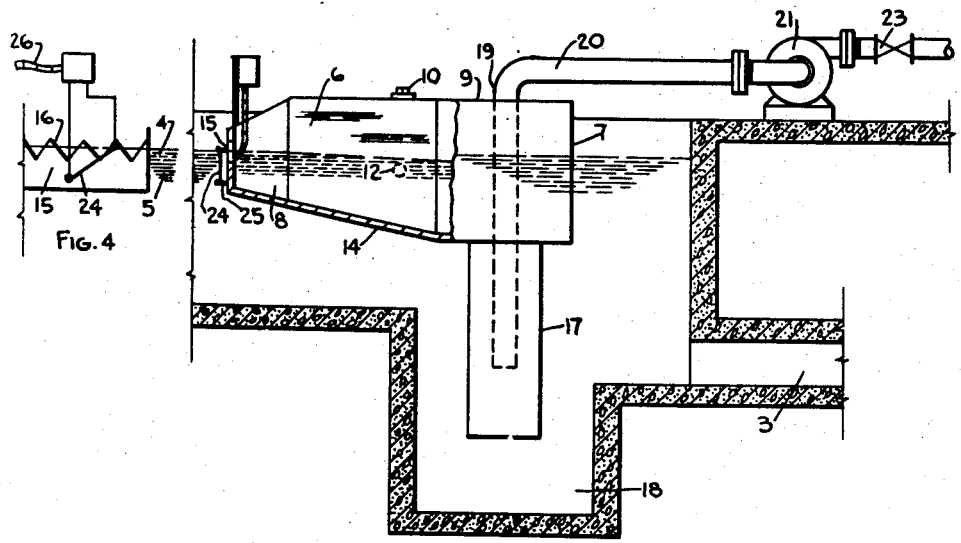
Fig. 4
Fig. 3
Inventors: Hermanus T. van Houten
Ludovicus J. P. Smulders
Johannes H. van Zeeland
By: Oswald H. Milmore
Their Attorney Patented Mar. 2, 1954

2,670,848

UNITED STATES PATENT OFFICE 2,670,848

FLOATING SELF-ADJUSTING LIQUID SKIMMER

Hermanus T. van Houten, Ludovicus J. P. Smulders, and Johannes H. van Zeeland, The Hague, Netherlands, assignors to Shell Development Company, Emeryville, Calif., a corporation of Delaware Application May 3, 1951, Serial No. 224,306
Claims priority, application Netherlands May 11, 1950

11 Claims. (Cl. 210—51)

This invention relates to apparatus for separating a stratum of liquid at a variable depth from a body of liquid that has different compositions at different levels that floats in the liquid so as to adapt itself to different liquid levels. The invention is particularly although not exclusively useful for skimming a supernatant liquid, such as oil, from a denser liquid, such as water, that may be flowed through an open channel such as a separating tank, culvert or the like, and will be described with reference to such an embodiment. However, the invention is not restricted to skimming operations and may, moreover, be applied to the separation of other types of liquids; moreover, while the device is preferably moored within a separating tank or other open channel through which the liquid is passed, certain features of the separating device may be used for separating a stratum from quiescent liquid, e. g., for skimming supernatant liquid from the surface of a larger body of liquid by drawing or towing the device in any suitable manner.

The effluent from industries which process oil or use it on a large scale must usually be freed from this oil before the effluent can be disposed of to avoid pollution of streams and harbors receiving the effluent and/or to recover the oil. Open separation tanks, through which the effluent can flow slowly and in which the oil may collect in a supernatant layer are often used for this purpose. This layer of oil, possibly together with water originating from the upper water layers, is then allowed to overflow into a separate reservoir for further treatment, while the water that has been freed from the oil is discharged from the bottom of the separation tank, for example, into a river or like extraneous watercourse. The fixed overflow rim of such a separation tank must be above the highest level of the extraneous watercourse when the water is to drain freely, for which reason the installation must be located at a sufficiently high level and the liquid level must be maintained at the overflow rim regardless of the rates of effluent flow, which requirements can often be satisfied only at considerable cost. To overcome these difficulties devices have heretofore been proposed wherein the oil flows into a floating skimmr the level of which can be allowed to adapt itself to the varying level of the extraneous stream or watercourse or to the liquid level in the flow channel in which the skimmer is operated as determined by the rate of flow therein from time to time.

Such devices have, however, heretofore presented certain difficulties in regard to controlling the depth to which the oil is skimmed and to the discharge of the skimmed oil from the floating skimmer. The thickness of the supernatant oil layer is often variable from time to time and, even when it is constant, difficulty is experienced in adjusting the height of the skimmer so as to draw off the supernatant liquid down to a desired depth. In most prior devices recourse was had to changing the buoyancy of the float or to adjustment of the level of the intake opening with respect to the float. Moreover, it is evident that when the thickness of the oil layer on the water to be purified increases for any reason the oil must be discharged from the skimming tank at a higher rate; in the prior devices, however, pumping oil at such increased rate tended to depress the oil level in the skimming tank, thereby reducing its weight and permitting it and the intake rim to rise in the water, resulting in skimming to a reduced depth and in slower influx of oil into the skimming tank, under circumstances in which skimming to a greater depth and influx at a higher rate would be desirable. Further, the weight of the hose or swivelled pipe connections used for discharging skimmed oil and particularly the frictional forces inherent in swivelled connections, have interfered with the precise vertical positioning of the floating skimmer.

It is an object of this invention to provide an improved device for separating a stratum of liquid from a body of liquid that differs in composition at different levels which device is of the type that floats in the liquid, wherein the depth to which the liquid is separated, e. g., skimmed, can be easily adjusted. Ancillary thereto, it is an object to provide a skimmer wherein the depth to which a supernatant liquid is skimmed can be regulated automatically in accordance with the thickness of the supernatant layer.

A further object is to provide a floating liquid separating device having an improved discharge arrangement including a sump on the float and a stationary discharge conduit that is of simple construction and does not interfere with the floating action or inclination of the separating device and is suitable for use either on the variable depth separator according to the invention or to known types of floating skimmers.

Still other objects will become apparent from the following description, taken in connection with the drawing forming a part of this specification and illustrating a preferred embodiment thereof, wherein:

Fig. 3 is an elevation view, partly in section of the float structure and of a portion of the separation tank;

Fig. 4 is an end elevation of the intake side of the float structure; and

Fig. 5 is a circuit diagram showing an instrument suitable for measuring and indicating the thickness of the oil layer.

Figure 1:
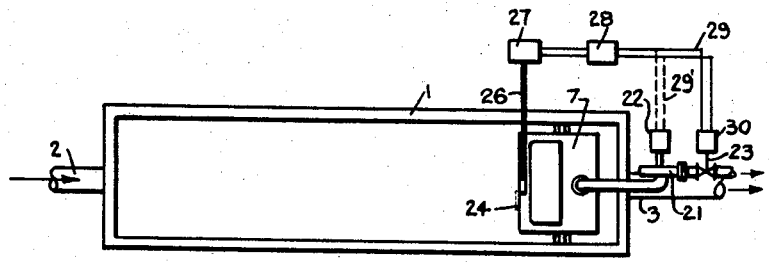
Fig. 1 is a plan view of a separation tank equipped with the liquid separating device.
Figure 2:
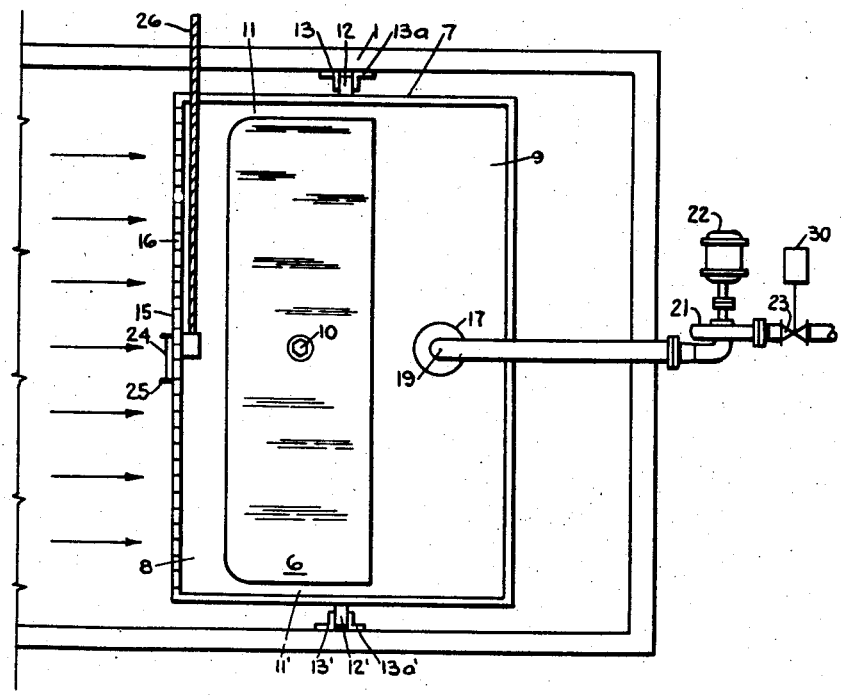
Fig. 2 is an enlarged plan view of the float structure and the stationary discharge pipe.

In summary, according to the invention the separating tank is a part of a float structure and has two horizontally separated, intercommunicating parts or compartments having between them a flow restriction device that offers some resistance to the passage of liquid, whereby liquid can be maintained in the two compartments at different levels by discharging liquid from one of them at a controlled rate. The tank will, therefore, float in the ambient liquid or stream at an inclination that depends upon the relative levels in the two compartments. The tank has an intake opening, e. g., an overflow weir, that rises or falls with changes in inclination, and through which liquid, e. g., the supernatant oil, is withdrawn from the ambient body of liquid at a variable depth into one part or compartment of the tank; this withdrawn liquid flows through the flow restriction device into the other part or compartment from which it is withdrawn. The rate of withdrawal can be regulated manually by an operator or can be controlled automatically by a controller that measures and indicates the thickness of the supernatant liquid or other layer in the ambient liquid or current that it is desired to withdraw. By such an asymmetrical construction of the tank the height of the intake opening can be altered in relation to the surface of the ambient liquid; for example, as applied to skimming operations, when the intake opening is at the first compartment as in the illustrated embodiment, an increase in the rate of discharge from the second compartment will depress the liquid level therein, causing a change in inclination of the float such as to lower the first compartment and the intake opening, thereby skimming to a greater depth, and accelerating the influx of supernatant liquid into the skimming tank.

The separating device is preferably placed in a separation tank through which the liquid flows with the intake in the flow structure directed upstream. Further, the float structure preferably extends fully across the separating tank, whereby the denser liquid must flow beneath the float to reach the discharge point therefor beyond the skimmer.

Referring to the drawings in detail, I represents an elongated separation tank having an inlet 2 for the water containing a lighter, immiscible liquid such as oil and an outlet 3 for purified water, flow being from left to right. The tank is of sufficient width to cause flow at a low rate, and is long enough to permit stratification, whereby a supernatant layer 4 of light liquid, such as oil, separates and collects over the denser liquid 5.

The floating separator, shown embodied as a skimmer, comprises a floating structure having an intermediate closed float compartment 6 mounted within a skimming tank 7 so as to divide the latter into first and second compartments 8 and 9 which serve as intake and discharge compartments, respectively. The float compartment 6 may be empty or may contain any suitable amount of solid admitted through a plugged opening 10 to adjust the buoyancy. This compartment extends only partly to the sides of the skimming tank so as to leave a restricted flow channel 11, 11' on each side interconnecting the tank compartments 8 and 9. The tank is seen to extend substantially across the width of the separating tank 1 and the float structure may be retained in the latter tank against horizontal displacement by any suitable means permitting free vertical movement and rotation in a vertical plane parallel to the longitudinal axis of the tank 1, such as lateral trunnion-like projections 12, 12' carried by the tank and vertically slidable between pairs of vertical structural angles 13, 13a and 13', 13a' fixed to the side of the separation tank. The bottom 14 of the skimming tank is preferably inclined downwardly toward the second compartment. The upstream wall 15 of the first compartment is lower than the other three sides to form a horizontally elongated intake opening extending the full width of the tank and down approximately to the level of the liquid in the separating tank on which the tank floats. This wall forms an overflow weir that preferably has a serrated or toothed upper edge, as indicated at 16. A tubular part 17, closed at the bottom, is fitted into an opening in the bottom 14 at the second compartment 9 and is in direct communication therewith. It forms a sump into which liquid flows freely from the second compartment. The separation tank 1 may be optionally deepened or provided with a sump 18 to accommodate the tubular part 17 when the float structure is resting on the bottom of the tank.

A stationary vertical discharge pipe 19 is supported from the edge of the separating tank 1 and extends into the sump 17 and communicates therewith at the bottom. It is connected through a suction line 20 to a stationary rotary or centrifugal pump 21 driven by an electric motor 22. A flow regulating valve 23 is fitted into the discharge line of the pump. Liquid can be discharged from the compartment 9 of the skimming tank through the pipe 19 regardless of the height of the float structure, and the external diameter of the pipe 19 is less than the internal diameter of the sump 17, whereby the float structure is free to rotate at least to a limited extent about a transverse axis that is at or parallel to the line joining the side projections 12, 12'. Moreover, the rate of liquid discharge from the skimming tank can be controlled by changing the speed of operation of the pump 21 through control of the motor 22 or by operating the flow control valve 23, both the pump and valve being flow means suitable for effecting such a control.

In operation, the liquid to be purified is admitted into tank 1 through inlet 2 and flows slowly toward the floating skimming tank 7. In this flow oil collects at the top to form a supernatant layer 4. The skimming tank can move vertically with respect to the vertical pipe 19 to adjust itself automatically to any liquid level within the tank 1; because the skimming tank is, in the normal operation, immersed mainly in the water, the height thereof is affected only to a small extent by the thickness of the oil layer. The upper stratum of the flowing liquid, consisting mainly of supernatant oil, flows over the weir 15 into the compartment 8 of the skimming tank while water flows beneath the skimming tank and is finally withdrawn from the separation tank 1 through the outlet 3. The skimmed oil flows through the restricted passages 11, 11' into the discharge compartment 9 and the sump 18. When the pump 21 is operated the level in the compartment 9 is lowered and remains lower than that in the intake compartment 8 because the channels 11, 11' provide a strong flow resistance; the difference in levels becomes greater as the rate of oil withdrawal is increased. This difference in liquid level causes the right side of the float structure to be lightened; in consequence the floating structure rotates in a counter-clockwise direction (as seen in Fig. 3) and assumes a different inclination, whereby the left side with the intake weir 15 descends. It therefore appears that, when the suction of the pump increases, the depth to which the oil is skimmed is automatically increased and a thicker layer of liquid flows into the skimming tank, this flow also occurring at an increased rate. The operator need only attend to the liquid discharged by the pump; if this contains too much water he can reduce the discharge flow by controlling the pump 21 or valve 23 and the floating skimming tank will adjust its inclination automatically to raise the weir 15 and skim to a smaller depth. It is evident that the quality of the discharged oil can be determined either by visual inspection or by any suitable instrument (not shown) that determines and indicates the nature of the effluent stream. As a variant, the rate of discharge can be varied by observing the amount of oil that flows beyond the skimming tank. In certain separations, wherein it is desired to skim off substantially only the lighter liquid, the oil can be withdrawn at a rate such that the interface between oil and water is somewhat below the height of the weir 15, by permitting the oil layer 4 to build up to a considerable depth. In such operations it is desirable that the sides of the tank 1 or the angles 13—13a' fit close to the sides of the floating structure to prevent by-passing of oil; the interface should not, of course, be permitted to become so low that oil will be carried out with the water flowing beneath the lower wall 14 of the skimming tank.

It is evident that the buoyancy of the floating structure is initially adjusted by loading the structure, e. g., through the plugged opening 10, to cause the structure to float at the proper level. This adjustment is, however, not critical and once made it need not usually be altered despite considerable variations in the rate of liquid flow through the tank 1 or variations in the amount of supernatant liquid carried thereby.

If desired, the rate of liquid flow in the discharge line can be controlled automatically in accordance with the thickness of a selected stratum of liquid in the separation tank. For example, it is possible to provide a measuring device for measuring the thickness of supernatant oil layer at any suitable point outside of the floating skimming tank, either prior to or subsequent to passage of the liquid under the float and yielding an electric or pneumatic indication of such thickness, and providing automatic means for regulating the flow means 21 or 23 in accordance with such indications. Moreover, such thickness measuring device may be mounted for vertical movement with the intake weir of the skimming tank to indicate the relation of the weir height to the interface between the oil and water. Such an optional arrangement is illustrated in the drawings, wherein 24 is an inclined thermal resistance element mounted in front of the weir 15 in spaced relation thereto by supports 25. The terminals are electrically connected by insulated wires in a flexible cable 26 to a power supply and detecting device 27. The latter is connected electrically to a servo-amplifier 28 which is connected by output wires 29 to an electrical valve-operating unit 30 which operates the valve 23. Alternatively, the servo-amplifier may be connected by wires 29' to the motor 22 for regulating the speed of operation of the motor and pump 21, the valve 23 being in this case not needed.

Referring to the circuit diagram of Fig. 5, the thermal resistance element 24 is shown to be connected by the wires of cable 26 into a bridge having impedances $R_1$, $R_2$ and $R_3$, e. g., resistors. A potentiometer $R_4$ connects the impedances $R_1$ and $R_2$ and portions of $R_4$ to the left and right, respectively, of the contact 37 thereof act as parts of $R_1$ and $R_2$, respectively. The junctions 32 and 33 are connected to the secondary terminals of a power transformer T which has the primary energized by a circuit including wires 34, 35. The junction 36 and contact 37 are connected by wires 38 and 39 to the servo-amplifier 28, which may be of any well-known design and need not be further described.

In operation the thermal resistance element 24 is heated by flow of electrical current from the transformer at a rate that depends upon the circuit constants and will assume a resistance that depends upon the temperature thereof. The temperature will depend upon the rate of heat dissipation to the water and oil, it being noted that the water 5 has a greater thermal conductivity than the oil 4. Hence the temperature will rise when the thickness of the oil layer 4 increases to wet a relatively greater portion of the element and will fall when the thickness is decreased and a greater part of the element is wetted with water. The potentiometer $R_4$ is adjusted so that when the interface between the liquids 4 and 5 is at the desired level with respect to the element 24 the bridge is in balance. Any change from this condition will unbalance the bridge to cause a potential difference or phase change to be transmitted to the servo-amplifier which thereupon actuates the valve-operating unit 30 or motor 22 to increase the rate of flow when the oil layer increases in thickness and causes a rise in the temperature of the element 24. This causes the floating skimming tank to change its inclination to lower the weir 15 to submerge the element 24 to bring a greater part thereof into the water until equilibrium is reestablished. Should the weir be so high as to have the upper part of the element 24 exposed to air the same result is achieved, it being noted that air has a thermal conductivity that is lower than that of oil. Conversely, a drop in the temperature of element 24, caused by greater immersion in water, unbalances the bridge in the opposite sense to decrease the liquid flow.

While a specific device for measuring and indicating the thickness of the supernatant layer was described, it is evident that the invention is not restricted thereto and that any suitable device may be employed.

We claim as our invention:

1. A liquid separating device for withdrawing at a variable depth a stratum from a body of liquid that has different compositions at different levels comprising: a tank adapted to float in said liquid at different inclinations in accordance with the weight distribution therein; partition means dividing said tank into first and second parts adapted to contain liquid at different depths therein; intake means movable vertically with a part of said tank for admitting liquid into said first part of the tank from said body of liquid at a depth thereof that increases as the intake means is immersed farther and vice versa; said second part of the tank being displaced horizontally from the intake means by a distance sufficient to immerse the intake means progressively farther in said body of liquid by a change in inclination of the tank as the depth of liquid in the second part is decreased, and vice versa; a passageway for flow of liquid from said first part to said second part, said passageway being the only communication for liquid between said parts of the tank and being restricted sufficiently to provide a strong resistance to the flow of liquid such as to maintain the liquid level in the said first part of the tank substantially higher than that in the said second part of the tank by a distance that increases with the rate of liquid flow through said passageway; and means for maintaining liquid in said second part at a controlled variable depth comprising a discharge conduit and variable flow means for controlling the rate of flow through the discharge conduit.

2. A separating device according to claim 1 wherein the variable flow means comprises: means mounted on the tank for measuring and indicating the thickness of a stratum of said body of liquid at a point outside of the tank; and a controller responsive to the indications of said measuring means for controlling the rate of liquid from said second part of the tank through said discharge conduit.

3. A separating device according to claim 1 wherein the tank carries a sump extending downwards beneath the bottom of the tank, said sump being in direct communication with said second part of the tank so as to receive liquid therefrom; said discharge conduit is mounted to have a fixed height extending downwardly into the sump and in communication therewith; and the variable flow means includes means for applying suction to said discharge conduit to withdraw liquid from the sump.

4. A skimming device for skimming a supernatant liquid from the surface of a liquid of greater density comprising: a separation tank adapted to contain a body of said denser liquid and supernatant liquid; a float structure adapted to float in said body of denser liquid within the separation tank at a height that changes with changes in the level of surface thereof; a skimming tank on said structure having an intake opening for admitting supernatant liquid into the tank from a point near the surface of the denser liquid; means for discharging liquid from said skimming tank; means mounted on the float structure for measuring and indicating the thickness of the supernatant liquid on the surface of said body of denser liquid at a point outside of the skimming tank; and flow means responsive to the indications of said measuring and indicating means for controlling the rate of liquid discharge from said skimming tank in accordance with said indications to increase said rate as the said thickness increases.

5. A skimming device for skimming to a variable depth a supernatant liquid from the surface of a liquid of greater density comprising: a float structure adapted to float in said denser liquid; a skimming tank fixed to said float structure and having first and second compartments at horizontally displaced parts of said structure whereby the float structure and tank will float at a variable inclination that depends upon the relative levels of liquids in said compartments; a restricted flow passageway interconnecting said compartments, said passageway being the only communication for liquid between said compartments and offering strong resistance to the flow of liquid between compartments sufficient to maintain the liquid level in said first compartment substantially higher than that in the second compartment by an amount in accordance with the rate of flow of liquid through said passageway; said skimming tank having an intake opening for admitting supernatant liquid into said first compartment communicating with the liquid outside of the tank at a level near the surface of the denser liquid, said intake opening being displaced horizontally from said second compartment by a distance sufficient to depress said intake opening progressively by change of inclination of the float structure as the liquid level in the second chamber is decreased and vice versa; and means for discharging liquid from said second compartment at a controlled rate to control the liquid level therein.

6. A skimming device according to claim 5 wherein the intake opening is horizontally elongated and extends substantially across the side of the tank parallel to a line dividing said first and second compartments, whereby all parts of said opening rise and fall in unison as the inclination of the float structure is altered.

7. A skimming device according to claim 6 wherein the float structure has a closed float compartment intermediate said first and second tank compartments and the said flow passageway comprises a flow channel on each side of the float compartment.

8. A skimming device for skimming to a variable depth a supernatant liquid from the surface of a liquid of greater density comprising: a float structure adapted to float in said denser liquid; a skimming tank fixed to said float structure and having first and second compartments at horizontally displaced parts of said structure whereby the float structure and tank will float at a variable inclination that depends upon the relative levels of liquids in said compartments; a restricted flow passageway interconnecting said compartments, said passageway being the only communication for liquid between said compartments and being restricted sufficiently to provide a strong resistance to the flow of liquid such as to maintain the liquid level in said first compartment substantially higher than that in the second compartment by a distance that increases with the rate of liquid flow through said passageway; said skimming tank having a horizontally elongated intake opening extending along the side of the skimming tank opposite to the second compartment near the surface of the denser liquid for admitting supernatant liquid into said first compartment, said opening being displaced horizontally from said second compartment by a distance sufficient to depress said intake opening progressively by change in inclination of the float structure as the liquid level in the second compartment is lowered and vice versa; and means for discharging liquid from said second compartment at a controlled rate to control the liquid level therein and thereby to control the said inclination.

9. A skimming device according to claim 8 wherein the float structure has a buoyant structure intermediate said first and second tank compartments and the bottom of the float structure is inclined downwardly from said intake opening to the second tank compartment.

10. In combination with the skimming device and separation tank, according to claim 8, an elongated separation tank for the flow of liquid along the length thereof and stratification of liquids of different densities and having an inlet at one end thereof and an outlet at the other end thereof, the side walls near said second end having a width only slightly in excess of the width of the float structure, said skimming device being disposed in the separation tank with the intake opening upstream and extending transversely to the flow of liquid therein, means mounted on the skimming tank for measuring and indicating the thickness of the layer of supernatant liquid in the separating tank outside of the skimming tank; and flow means for controlling the rate of discharge of liquid from the second compartment of the skimming tank in accordance with the indications from said measuring means to increase said rate as the said thickness increases, whereby the depth to which supernatant liquid is skimmed is automatically regulated in accordance with the thickness of said supernatant liquid.

11. A skimming device comprising: a separation tank adapted to contain a body of relatively denser liquid and a supernatant liquid of relatively lower density, said tank having a bottom and a first sump extending downwardly from said bottom; a float structure adapted to float in said denser liquid at a height that changes with changes in the level of the surface thereof; a skimming tank on said structure having an intake opening for admitting supernatant liquid into the skimming tank from a point near the surface of the denser liquid; a second sump projecting beneath the bottom of the skimming tank and in liquid-receiving communication therewith, said second sump being adapted to enter said first sump when the float structure descends; a stationary pipe extending downwardly into said second sump and in communication therewith at a level beneath the top of said first sump; and means for applying suction to said discharge pipe to withdraw liquid from said second sump, whereby liquid may be discharged from said skimming tank despite large changes in the level of the tank.

HERMANUS T. van HOUTEN.
LUDOVICUS J. P. SMULDERS.
JOHANNES H. van ZEELAND.

References Cited in the file of this patent

UNITED STATES PATENTS

| Number | Name | Date |
|---|---|---|
| 1,942,241 | Duhme | Jan. 2, 1934 |
| 2,051,149 | Nordell | Aug. 18, 1936 |
| 2,072,206 | Hetzer | Mar. 2, 1937 |
| 2,119,348 | Parsons | May 31, 1938 |
| 2,330,508 | McColl | Sept. 28, 1943 |
| 2,348,938 | Stahl et al. | May 16, 1944 |
| 2,439,633 | Reinhart | Apr. 13, 1948 |
| 2,497,177 | McClintock et al. | Feb. 4, 1950 |
| 2,509,933 | Lind | May 30, 1950 |
| 2,608,300 | Small | Aug. 26, 1952 |